United States Patent [19]

Flood et al.

[11] 4,436,872

[45] Mar. 13, 1984

[54] HIGH IMPACT MOLDING COMPOSITIONS

[75] Inventors: Paul W. Flood, Lake Hopatcong; Charles D. Mason, Chatham Township; Stephen R. Schulze, West Caldwell, all of N.J.

[73] Assignee: Allied Corporation, Morris Township, Morris County, N.J.

[21] Appl. No.: 363,365

[22] Filed: Mar. 29, 1982

Related U.S. Application Data

[63] Continuation of Ser. No. 209,182, Nov. 21, 1980, Pat. No. 4,335,223, which is a continuation-in-part of Ser. No. 46,536, Jun. 7, 1979, abandoned, which is a continuation-in-part of Ser. No. 914,705, Jun. 12, 1978, abandoned.

[51] Int. Cl.$^3$ .................. C08L 77/00; C08L 77/02
[52] U.S. Cl. .................................. 525/179; 525/183
[58] Field of Search ............................. 525/179, 183

[56] References Cited

U.S. PATENT DOCUMENTS

| | | | |
|---|---|---|---|
| 3,264,272 | 8/1966 | Rees | 526/13 |
| 3,375,219 | 3/1968 | Robb | 260/857 L |
| 3,472,916 | 10/1969 | Anspon | 260/857 L |
| 3,492,916 | 1/1970 | Starkweather | 260/857 L |
| 3,516,961 | 6/1970 | Robb | 260/857 L |
| 3,676,400 | 7/1972 | Kohan | 260/857 L |
| 3,833,708 | 9/1974 | Miller | 260/857 L |
| 3,845,163 | 10/1974 | Murch | 260/857 L |
| 4,035,436 | 7/1977 | Matsubara | 260/857 L |
| 4,078,014 | 3/1978 | Starkweather | 260/857 L |
| 4,160,790 | 7/1979 | Mason | 525/179 |

FOREIGN PATENT DOCUMENTS

| | | | |
|---|---|---|---|
| 740501 | 8/1966 | Canada | 260/857 L |
| 1440810 | 6/1976 | United Kingdom | 260/857 L |

*Primary Examiner*—Paul Lieberman
*Attorney, Agent, or Firm*—Richard A. Negin; Patrick L. Henry

[57] ABSTRACT

Certain metal compounds such as antimony oxide and magnesium oxide are used to enhance the notched Izod impact resistance of molded objects made from selected polyamide copolymer compositions comprised of polyepsiloncaprolactam (nylon-6) or polyhexamethyleneadipamide (nylon-66) and preferably ethylene/ethyl acrylate and ethylene/acrylic acid copolymers.

18 Claims, No Drawings

HIGH IMPACT MOLDING COMPOSITIONS

CROSS-REFERENCES TO RELATED APPLICATIONS

This application is a continuation, of application Ser. No. 209,182, filed Nov. 21, 1980 now U.S. Pat. No. 4,335,223, which is a continuation-in-part application of U.S. application Ser. No. 046,536, filed June 7, 1979, now abandoned which is a continuation-in-part application of U.S. application Ser. No. 914,705, filed June 12, 1978 now abandoned.

BACKGROUND OF THE INVENTION

1. Field of the Invention

This invention relates to the use of selected metal compounds as modifiers for preparing high impact resistant nylon-6 or nylon-66 molding compositions.

2. Brief Description of the Prior Art

It is known (U.S. Pat. No. 3,388,186 issued June 11, 1968 to Kray et al.) that compositions of nylon-6, containing ethylene copolymers having a minor proportion of acrylic or methacrylic acid or alkyl ester thereof as backbone and having grafted nylon-6 side chains, show higher impact resistance than nylon-6 molding compositions not containing the above graft copolymers. These compositions are prepared by reacting caprolactam in the ethylene copolymer melt.

U.S. Pat. No. 3,472,916 of Oct. 14, 1969 to Anspon et al. discloses blends of 70–90% by weight nylon-6 homopolymer with correspondingly 2–30% by weight of ethylene/acrylic or methacrylic alkyl ester copolymer, having improved Izod impact resistance, compared to nylon-6 alone. The alkyl group in the alkyl ester copolymer contains 1–4 carbon atoms and the alkyl ester is from 10 to 60 percent by weight of the copolymer. The copolymer has "highly uniform distribution of the acrylic ester in the copolymer", presumably a random distribution. These blends are prepared by mixing together and subsequently co-extruding the ingredients.

U.S. Pat. No. 3,963,799 issued June 15, 1976 to Starkweather, discloses ternary blends of polyanide, polyethylene or copolymers thereof, and a small amount of copolymer having an ethylenic backbone and nylon-6 side chains.

Also, U.S. Pat. No. 4,160,790, incorporated herein by reference, discloses synergistic improvement of nylon-6 or nylon-66 impact resistance by blending, in the melt, with minor proportions of both an ethylene/acrylic acid copolymer and an ethylene/ethyl acrylate copolymer.

French Pat. No. 1,386,563, of issue date Dec. 14, 1964, relates to compositions of 50–99 percent by weight polyamide and the balance an olefin copolymer containing up to 10 mol percent of acid side chains.

Journal of Polymer Science, Volume 54, Pages 388 and 389 (1961) in an article entitled "Linear Polyesters", by R. E. Wilfong, discloses a list of catalytic agents including various metal oxides suitable for use in the preparation of polyesters.

None of the above references disclose the use of metal compounds to enhance the impact resistance of nylon-6 or nylon-66 polyamide compositions with both a copolymer of an olefin and an acid-containing comonomer and a copolymer of an olefin and a $C_1$–$C_4$ alkyl ester of said acid comonomer. The compositions of the present invention are useful as containers, e.g. bottles, or as film wrapping or as fibers.

SUMMARY OF THE INVENTION

In accordance with the present invention there is provided in a melt-blended polyamide composition of a polyhexamethyleneadipamide, polyepsiloncaprolactam, or mixture thereof, as 60–98 percent by weight of the composition, blended with a copolymer of a $C_2$ to $C_5$ $\alpha$-olefin with 1 to 20 mol percent of a $C_3$ to $C_8$ unsaturated carboxylic acid and a copolymer of a $C_2$ to $C_5$ $\alpha$-olefin with 1 to 20 mol percent of a $C_1$ to $C_4$ alkyl ester of such acid wherein the weight proportions between the acid and ester copolymer are from 1 part of acid copolymer to 10 parts ester copolymer up to 30 parts of acid copolymer to 1 part ester copolymer by weight; and about 0.05 to 1.0 wt. %, based on the total weight of the composition of a metal compound wherein the metal is selected from Group IA, IB, IIA, IIB, IIIA, IVA, VA, VIB, VIIB, and VIIIB of the Periodic Table of the Elements, and the anion of the metal compound is selected from the group consisting of oxides, hydrides, formates, acetates, alcoholates, glycolates, and halides and wherein the notched Izod impact resistance of the composition is higher than for a like composition not containing the metal compound.

In preferred embodiments there is provided antimony oxide or magnesium oxide as the impact modifier in polyhexamethyleneadipamide/ethylene-ethyl acrylate/ethylene-acrylic acid copolymer compositions or polyepsiloncaprolactam/ethylene-ethyl acrylate/ethylene-acrylic acid copolymer compositions.

DESCRIPTION OF THE PREFERRED EMBODIMENTS

Polyamides suitable for use in the present invention are polyhexamethyleneadipamide (nylon-66), polyepsiloncaprolactam (nylon-6) or mixtures thereof, preferably possessing a number average molecular weight, as measured by membrane osmometry, of about 15,000 to 40,000.

Nylon-6 or nylon-66 suitable for use herein can contain a variety of terminal functionality, and preferred is that containing: (a) a carboxyl group attached to both ends of the polyamide chain; (b) a carboxyl group attached to one end and an acetamide group attached to the other end of the polyamide chain; (c) an amino group attached to both ends of the polyamide chain; and (d) a carboxyl group attached to one end and an amino group attached to the other end of the polyamide chain. More preferred is nylon-6 or nylon-66 having a carboxyl group attached to one end and an amino group attached to the other end of the polyamide chain.

Carboxylic acid-containing comonomers suitable for preparing the ethylene/carboxylic acid copolymer include those monomers selected from the group consisting of unsaturated monocarboxylic acids of 3 to 6 carbon atoms, unsaturated dicarboxylic acids of 4 to 8 carbon atoms, and mixtures thereof. Representative examples of such monomers include acrylic acid, methacrylic acid, crotonic acid, maleic acid, and fumaric acid. Preferred are acrylic acid and methacrylic acid, more preferred is acrylic acid.

Ester-containing monomers suitable for preparing the ethylene/alkyl ester copolymers of the present invention are those $C_1$ to $C_4$ alkyl esters of the aforementioned carboxylic acid-containing monomers, preferably acrylic acid and methacrylic acid, or other substituted acrylic acids. Representative examples of such esters include methyl, ethyl, propyl, isopropyl, butyl, isobutyl and t-butyl esters of such acids. Preferred are methyl and ethyl acrylate and methyl and ethyl methacrylate; more preferred is ethyl acrylate and ethyl methylate; most preferred is ethyl acrylate.

A preferred α-olefin suitable for use in the present copolymers is ethylene. Therefore, in the most preferred embodiments of the present invention, the nylon-6 or nylon-66 compositions will contain minor proportions of ethylene/acrylic acid copolymer (EAA) and ethylene/ethyl acrylate copolymer (EEA) as well as the modifier. The polyamide ingredient amounts to about 60–98 percent by weight of the composition, the balance consisting essentially of EAA and EEA and an effective amount of inorganic modifier. Moreover, these preferred copolymers of ethylene each contain from 1 to 20 mol percent of the said comonomer; preferably, 3–15 mol percent, and more preferably 3–5 mol percent of acrylic acid monomer in the EAA copolymer; and preferably 5–10 mol percent of the ethyl acrylate in the EEA copolymer. The preferred copolymers are characterized by a melt index in the range of 2–20 g/10 min. as measured by ASTM D-1238 employing a load of 2,160 g and a temperature of 190° C.

The polyamides, nylon-6 and nylon-66, as well as the ethylene copolymers suitable for use herein, can be prepared by any conventional polymerization processes used in the art.

Especially preferred compositions of the present invention generally contain about 2 to 40, more preferably 12 to 30, weight percent of ethylene copolymers. There is from 1 part of acid copolymer to 10 parts of ester copolymer up to 30 parts of acid copolymer to 1 part of ester copolymer by weight. Preferably, there is from 1 to 10 weight percent of the ester copolymer, and from 1 to 30 weight percent of the acid copolymer. More preferably, there is from 10 to 30 weight percent of the acid copolymer. The composition contains about 60 to 98 weight percent, and preferably 70 to 88 weight percent, of nylon-6, nylon-66, or mixtures thereof, having a melt index (ASTM D-1238, condition "Q", 1000 g load at 235° C.) in the range of 2 to 20 g/10 minutes, and containing up to 15% by weight, based on the nylon ingredient, of nylon monomer and water-extractable oligomers, of either nylon-6 or nylon-66 type. There is from about 0.05 to 1.0 weight percent, preferably 0.10 to 0.75 weight percent, and more preferably 0.2 to 0.6 weight percent of inorganic modifier. All weight percents are based on the total weight of the composition.

The inorganic modifier is a metal compound described in detail below. An improvement in impact properties is experienced by the blend containing the impact modifier. Although the mechanism leading to the improvement in impact is not clear, it is clear that there is an improvement not resulting from the neutralization of the carboxylic acid groups of the acid copolymer by the metal cation of the metal compound to form an ionic copolymer in situ. This is particularly illustrated by reviewing Example 8. In Example 8, the metal cation of the metal compound, antimony oxide, does not react with the carboxylic acid groups of the acid copolymer, under the extrusion mixing conditions similar to those used to blend the high impact composition of the present invention. However, considering the art relating to the formation of ionic copolymers, such as U.S. Pat. No. 3,264,272, the conditions necessary to neutralize the carboxylic acid groups of the acid copolymer in the composition of the present invention are not present during the blending of the composition.

Therefore, even if metal compounds which are basic enough to theoretically react to neutralize the carboxylic groups are used in the composition of the present invention, the conditions under which the composition is blended may not be sufficient for the reaction to proceed with any significance, if at all. The improvement in impact by the addition of such metal compounds is, therefore, not dependent on the formation of an ionic copolymer.

Metal compounds suitable for use as modifiers are those compounds wherein the metal or cation is selected from groups IA, IB, IIA, IIB, IIIA, IVA, VA, VIB, VIIB, and VIIIB of the Periodic Table of the Elements. Preferred metals are lithium, sodium, potassium, calcium, beryllium, magnesium, zinc, cadmium, strontium, aluminum, lead, chromium, molybdenum, manganese, iron, cobalt, germanium, nickel, copper, silver, mercury, tin, platinum, boron, antimony, bismuth, and palladium. More preferred are antimony, copper, manganese, zinc, lithium, calcium, and lead. Most preferred is antimony. The anion portion of the metal compound is selected from the group consisting of oxides, hydrides, formates, actates, alcoholates, glycolates and halides. More preferred are oxides, halides and acetates, and more preferred are oxides. Particularly preferred are antimony oxide and magnesium oxide. The compounds set forth on pages 388–9, Volume 54 of *Journal of Polymer Science* (1961), are suitable for use as modifiers in the present invention.

The metal compound modifier is present in the instant polyamide compositions in an effective amount, and by the term "effective amount" is meant that amount of modifier required to increase the Izod impact resistance of molded articles of the present polyamide compositions. Generally, the amount of modifier required for such an increase ranges from about 0.05 to 1.0 wt. % based on the total weight of the composition. The precise amount of modifier is dependent on such factors as concentration of each of the ingredients and the mixing or extruding conditions such as temperature, shear, etc., which can be easily determined by routine experimentation.

The molding compositions of the present invention can also contain conventional additives in small quantities such as specifically up to about 0.25 percent by weight of a metal soap as mold release agent or extrusion aid, and optionally a heat stabilizer such as a stabilizer based on copper. The present compositions can also contain plasticizers such as nylon-6 or nylon-66 water extractable oligomers, also referred to herein as "nylon" oligomers, in amounts preferably not over 15% by weight of the polyamide ingredient. They can also include colarants, such a pigments and carbon black, as well as conventional antioxidants and stabilizers.

The molding compositions of the present invention are prepared by homogeneously mixing the ingredients at temperatures between about 230° to 340° C., preferably 260° to 300° C., in conventional homogeneous mixing machines. By the term "homogeneously mixing" is meant a thorough intense mixing of the components under conditions where high shear stresses prevail, particularly intense kneading. Especially suitable machines for homogeneous mixing include the one-shaft or multi-shaft screw extruders, kneaders, and calenders which have a plurality of pairs of rollers.

The examples which follow illustrate our invention and set forth the best modes which we have contemplated for carrying out the invention, but are intended as illustrative only and not as limiting.

EXAMPLE 1

As indicated in Table I below, various nylon-6 compositions were prepared with ethylene/ethyl acrylate ("EEA") and/or ethylene/acrylic acid ("EAA") copolymers. The EEA copolymer was that commercially available from Union Carbide under the trademark BAKELITE flexible ethylene copolymer DPD-6169, described as having a melt index of 6 g/10 min. and ethyl acrylate content of 18 weight percent (about 5.8 mol percent). The EAA copolymer was that commercially available from Dow Chemical as DOW EAA Resin 455, described as having a melt index of 5.5 g/10 min. and acrylic acid content of 8 weight percent (about 3.3 mol percent).

The ingredients, in pellet form except for the inorganic modifier, were dry blended for about 20 minutes and then mixed and extruded under shearing action by an NRM single screw extruder in the melt; and extruded as a strand which was cooled and pelleted. The extruder was maintained at an RPM of 31, contained four heating zones, all of which were at a temperature of 300° C., and the die was at a temperature of 260° C.

The resulting compositions were injection molded into test bars and tested as set forth in Table I. D-1238 and D-256 indicate ASTM testing procedures.

TABLE I

| | Comp. A | Comp. B | Comp. C | Comp. D | Comp. E | Ex.1 |
|---|---|---|---|---|---|---|
| Nylon[1] (pph) | 73 | 73 | 73 | 73 | 73 | 73 |
| EAA (pph) | 27 | 27 | | | 18 | 18 |
| EEA (pph) | | | 27 | 27 | 9 | 9 |
| $Sb_2O_3$ (pph) | | 0.15 | | 0.15 | | 0.15 |
| Melt Index[2] (g/10 min.) | 1.4 | 1.3 | 3.9 | 3.8 | 1.5 | 1.6 |
| Izod (notched)[3] ft. lbs./inch notch | 2.1 | 2.0 | 2.6 | 1.7 | 2.9 | 9.0 |

[1]Nylon-6 having a terminal carboxyl group on one end and an amino group on the other end of nylon chain.
[2]M.I. D-1238 "Q" 1000 g/235° C.
[3]D-256 Dry.

EXAMPLE 2

As indicated in Table II below, various nylon-6 compositions were prepared according to the procedure set forth in the previous examples. The nylon in these examples contains amine groups on both ends of the nylon chain.

TABLE II

| | Comp. F | Comp. G | Comp. H | Comp. I | Comp. J | Ex.2 |
|---|---|---|---|---|---|---|
| Nylon (pph) | 76 | 76 | 76 | 76 | 76 | 76 |
| EAA (pph) | | | 24 | 24 | 18 | 18 |
| EEA (pph) | 24 | 24 | | | 6 | 6 |
| $Sb_2O_3$ (pph) | | 0.10 | | 0.10 | | 0.10 |
| Melt Index[1] (g/10 min.) | 5.2 | 5.9 | 2.7 | 2.5 | 2.9 | 2.8 |
| Izod (notched)[2] ft. lbs./inch notch | 1.9 | 1.6 | 2.4 | 2.6 | 3.5 | 9.6 |

[1]D-1238 "Q" 1000 g/235° C.
[2]D-256 Dry.

EXAMPLES 3-5

Several samples were prepared according to the procedure set forth in Examples 1 and 2. The properties of ingredients and the properties of the resulting compositions are contained in Table III below.

TABLE III

| | Comp.K | Ex.3 | Ex.4 | Comp.L | Ex.5 |
|---|---|---|---|---|---|
| Copper Acetate | | 0.20 | | | |
| Calcium Acetate | | | .05 | | |
| Lithium Chloride | | | | | 0.10 |
| Polycaprolactam[1] (pph) | 72.00 | 71.80 | 71.95 | 74.0 | 73.90 |
| Caprolactam (pph) | 1.00 | 1.00 | 1.00 | 1.00 | 1.00 |
| Ethylene Ethyl Acrylate (pph) | 5 | 5 | 5 | 7 | 7 |
| Ethylene Acrylic Acid (pph) | 22 | 22 | 22 | 18 | 18 |
| Izod (notched)[2] ft. lbs./inch notch | 4.0 | 7.5 | 5.7 | 8.0 | 13.5 |
| Melt Index[3] | 3.30 | 3.46 | 3.44 | 3.90 | 3.59 |

[1]Polycaprolactam containing 10% by wt. of caprolactam monomer.
[2]D-256 Dry.
[3]M.I. D-1238 "Q" 1000 g/235° C.

The above table illustrates other metal salts suitable for use in the present invention.

EXAMPLE 6

Several samples are prepared with the ingredients according to the procedure set forth in Examples 1 and 2, except that the polyamide is the condensation product of hexamethylene diamine with adipic acid. The resulting composition will be found to have Izod ft. lbs./inch notch of substantially higher values than such compositions not containing antimony oxide.

EXAMPLE 7

Following the general procedure and utilizing the apparatus described above in Example 1, two molding compositions, listed below in Table IV, were prepared and injection molded. The composition contained nylon-66 polyamide in place of nylon-6. The EEA and EAA copolymers used were the same as described above in Example 1. The compositions were prepared by first dry blending the components together on a roll mill. The compositions were then extruded through the above-described NRM extruder, containing a 2½" extrusion die, which was at a temperature of 243° C. The extruder zone temperatures were $Z_1=580°$ F., $Z_2=560°$ F., $Z_3=530°$ F. and $Z_4=500°$ F. ($Z_1$ being the initial zone and $Z_4$ being the exit zone prior to the die). The extruder was maintained at a speed of 80–82 rpm. The results are listed below in Table IV.

TABLE IV

| | Comp. M | Ex. 7 |
|---|---|---|
| Nylon-66[1] (pph) | 75.00 | 74.80 |
| EAA (pph) | 18.00 | 18.00 |
| EEA (pph) | 7.00 | 7.00 |
| $Sb_2O_3$ (pph) | — | 0.20 |
| Melt Index[2] (g/10 min.) | 8.7 | 8.6 |
| Izod (notched)[3] ft. lbs./inch notch | 2.5 | 3.4 |

[1]Nylon-66 being commercially available Du Pont Zytel ™ 101.
[2]M.I. 20.5, measured at 175° C.
[3]D-256 dry.

The increase in notch Izod impact strength by the incorporation of a small amount of antimony oxide into the nylon-66 polymeric composition is quite apparent.

EXAMPLE 8

This example is included to show that the improved impact resistance obtained by the addition of the metal compound, in particular antimony oxide, is not the result of the formation of an ionic copolymer in situ by the metal cation of the metal compound neutralized by the carboxylic acid groups of an ethylene acrylic acid copolymer. Ethylene acrylic acid copolymer (DOW EAA 455) was extruded through an NRM extruder, at 250° C. to 260° C., with sufficient antimony oxide for 100% neutralization of the copolymer acid groups. Infrared analysis is showed a complete absence of any absorption in the frequencies around 1560 cm$^{-1}$, characteristic of carboxylate ions. It is noted that the inability of the antimony to neutralize the carboxylic acid groups is not unexpected under the blending conditions used, considering the lack of basicity of the antimony oxide. It is noted that the probability of forming an ionic copolymer in situ in the composition of the present invention is further diminished by dilution of EAA with nylon and EEA.

This result indicates that improved impact properties of the polyamide composition do not result from the formation of an ionic copolymer in situ.

EXAMPLES 9-13

Examples 9-13, summarized in Table V below, are for various nylon-6 compositions. These compositions contain ethylene ethyl acrylate copolymer (EEA), Union Carbide, DPD-6169 (See Ex. 1), and ethylene acrylic acid copolymer (EAA), DOW EAA 455 (See Ex. 1). Each example includes 0.25% by weight of zinc stearate (ZnS) as a mold release agent. The ingredients were blended in an NRM 2½ inch single screw extruder. The extruder operated at 85 rpm and had four temperature zones in addition to the flange and the die. The temperatures were: Zone 1—575° F.; Zone 2—550° F.; Zone 3—550° F.; Zone 4—500° F.; flange—450° F.; and the die—450° F.

The resulting compositions were injection molded into test bars and tested according to Melt Index ASTM Test No. D-1238 "Q", and notched Izod ASTM Test No. D-256.

TABLE V

|  | Ex. 9 | Ex. 10 | Ex. 11 | Ex. 12 | Ex. 13 |
|---|---|---|---|---|---|
| Nylon-6[1] | 71.25 | 71.00 |  | 71.25 |  |
| Nylon-6[2] |  |  | 71.25 |  | 71.25 |
| EEA | 7.0 | 7.0 | 4.0 | 6.0 | 6.0 |
| EAA | 21.0 | 21.0 | 24.0 | 22.0 | 22.0 |
| MgO | 0.50 | 0.75 | 0.50 | 0.50 | 0.50 |
| ZnS | 0.25 | 0.25 | 0.25 | 0.25 | 0.25 |
| Melt Index (g/10 min.) | 1.8 | 1.8 | 1.75 | 1.77 | 2.30 |
| Izod (notched) ft. lbs./inch notch | 20.5 | 11.7 | 19.2 | 19.9 | 16.9 |

[1]Nylon-6 having an excess of chain ends terminated by carboxyl groups.
[2]Nylon-6 having an excess of chain ends terminated by amino groups.

A review of Table V shows that high impact properties are obtained with carboxyl or amino terminated nylon-6 using magnesium oxide as an impact modifier. The values are relatively high considering any of the preceding Comparatives.

While exemplary embodiments of the invention have been described, the true scope of the invention is to be determined from the following claims:

What is claimed:

1. A melt-blended polyamide composition comprising:

from 60 to 98 percent by weight of the composition of a polyamide selected from the group consisting of polyhexamethyleneadipamide, polyepsiloncaprolactam, and a mixture of polyhexamethyleneadipamide and polyepsiloncaprolactam, an acid copolymer of an α-olefin having 2 to 5 carbons, with 1 to 20 mol percent of an unsaturated carboxylic acid having 3 to 8 carbons;

an ester copolymer of an α-olefin having 2 to 5 carbons, with 1 to 20 mol percent of an alkyl ester of an unsaturated carboxylic acid having 3 to 8 carbons and the alkyl group having 1 to 4 carbon atoms, the weight proportions between the acid copolymer and ester copolymer being from 1 part of acid copolymer to 10 parts of ester copolymer up to 30 parts acid copolymer to 1 part ester copolymer;

from about 0.05 to 1.0 percent by weight based on the weight of the composition of a metal compound having the cation of a metal selected from Group IA, IB, IIA, IIB, IIIA, IVA, VA, VIB, VIIB, and VIIIB of the Periodic Table of the Elements, and the anion of the metal compound is selected from the group consisting of hydrides, formates, acetates, alcoholates, glycolates, and halides and wherein the notched Izod impact resistance of the composition is higher than for a like composition not containing the metal compound the composition being blended under conditions wherein the metal compound remains substantially unreacted with the copolymer acid.

2. The composition as recited in claim 1 wherein said polyamide is polyhexamethyleneadipamide.

3. The composition as recited in claim 1 wherein the metal is selected from the group consisting of antimony, copper, manganese, zinc, lithium, calcium and lead wherein the anion is selected from the group consisting of halides, and acetates.

4. The composition as recited in claim 1 wherein the acid copolymer is a copolymer of ethylene and a monomer selected from the group consisting of acrylic acid, methacrylic acid, crotonic acid, maleic acid and fumaric acid and the ester copolymer is a copolymer of ethylene and a monomer selected from the group consisting of methyl acrylate, ethyl acrylate, methyl methacrylate and ethyl methacrylate.

5. The composition as recited in claim 4 wherein the acid copolymer is ethylene/acrylic acid and the ester copolymer is ethylene/ethyl acrylate.

6. The composition as recited in claim 5 wherein the ethylene/acrylic acid copolymer contains 3 to 5 mol percent of acrylic acid units and the ethylene/ethyl acrylate copolymer contains 5 to 10 mol percent of ethyl acrylate units, and each copolymer has a melt index as herein defined in the range of 2 to 20 g/10 minutes.

7. The composition as recited in claim 1 containing about 12-30 weight percent ethylene copolymers, containing from 70 to 88 weight percent of polyhexamethyleneadipamide having a melt index as herein defined in the range of 2 to 20 g/10 minutes; and containing up to 15% by weight, based on the polyamide ingredient, of polyhexamethyleneadipamide monomer and water-extractable oligomers.

8. The composition as recited in claim 1 wherein there is from 1 to 10 weight percent of the total composition of the ester copolymer, and from 1 to 30 weight percent of the total composition of the acid copolymer.

9. The composition as recited in claim 8 wherein there is from 10 to 30 weight percent of the total composition of the acid copolymer.

10. A melt blended composition comprising:
from about 60% to about 98% by weight of the composition of polyhexamethyleneadipamide;
from about 2% to about 40% by weight of the composition of an ethylene acrylic acid copolymer and an ethylene/ethyl acrylate copolymer; and
from 0.05% to 1.0% by weight of the composition of a metal compound selected from the group consisting of copper acetate, calcium acetate, and lithium chloride, the composition being blended under conditions wherein the metal compound remains substantially unreacted with the polymer acid.

11. The melt blended composition as recited in claim 16 wherein there is 0.1% to 0.75% of the metal compound.

12. A melt-blended polyamide composition comprising:
from 60 to 98 percent by weight of the composition of polyepsiloncaprolactam;
an acid copolymer of an α-olefin having 2 to 5 carbons, with 1 to 20 mol percent of an unsaturated carboxylic acid having 3 to 8 carbons;
an ester copolymer of an α-olefin having 2 to 5 carbons, with 1 to 20 mol percent of an alkyl ester of an unsaturated carboxylic acid having 3 to 8 carbons and the alkyl group having 1 to 4 carbon atoms, the weight proportions between the acid copolymer and ester copolymer being from 1 part of acid copolymer to 10 parts of ester copolymer up to 30 parts acid copolymer to 1 part ester copolymer;
from about 0.05 to 1.0 percent by weight based on the weight of the composition of a metal compound having the cation of a metal selected from Group IA, IB, IIA, IIB, IIIA, IVA, VA, VIB, VIIB, and VIIIB of the Periodic Table of the Elements, and the anion of the metal compound is selected from the group consisting of hydrides, formates, acetates, alcoholates, glycolates, and halides and wherein the notched Izod impact resistance of the composition is higher than for a like composition not containing the metal compound the composition being blended under conditions wherein the metal compound remains substantially unreacted with the copolymer acid.

13. The composition as recited in claim 12 wherein the metal is selected from the group consisting of antimony, copper, manganese, zinc, lithium, calcium and lead and wherein the anion is selected from the group consisting of halides, and acetates.

14. The composition as recited in claim 12 wherein the acid copolymer is a copolymer of ethylene and a monomer selected from the group consisting of acrylic acid, methacrylic acid, crotonic acid, maleic acid and fumaric acid and the ester copolymer is a copolymer of ethylene and a monomer selected from the group consisting of methyl acrylate, ethyl acrylate, methyl methacrylate and ethyl methacrylate.

15. The composition of claim 1 wherein the acid copolymer is ethylene/acrylic acid and the ester copolymer is ethylene/ethyl/acrylate.

16. The compositions of claim 14 wherein the ethylene/acrylic acid copolymer contains 3 to 5 mol percent of acrylic acid units and the ethylene/ethyl acrylate copolymer contains 5 to 10 mol percent of ethyl acrylate units, and each copolymer has a melt index as herein defined in the range of 2 to 20 g/10 minutes.

17. The composition as recited in claim 1 wherein there is from 1 to 10 weight percent of the total composition of the ester copolymer, and from 1 to 30 weight percent of the total composition of the acid copolymer.

18. The composition as recited in claim 15 wherein there is from 10 to 30 weight percent of the total composition of the acid copolymer.

* * * * *